(12) United States Patent
Ikeda et al.

(10) Patent No.: US 12,036,900 B2
(45) Date of Patent: Jul. 16, 2024

(54) SEAT STATE SWITCHING MECHANISM AND SEAT PROVIDED WITH SAID SEAT STATE SWITCHING MECHANISM

(71) Applicant: DELTA KOGYO CO., LTD., Hiroshima (JP)

(72) Inventors: Yuji Ikeda, Hiroshima (JP); Yoji Nishida, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 380 days.

(21) Appl. No.: 17/604,967

(22) PCT Filed: Jul. 17, 2020

(86) PCT No.: PCT/JP2020/027959
§ 371 (c)(1),
(2) Date: Oct. 19, 2021

(87) PCT Pub. No.: WO2021/024766
PCT Pub. Date: Feb. 11, 2021

(65) Prior Publication Data
US 2022/0219575 A1    Jul. 14, 2022

(30) Foreign Application Priority Data

Aug. 8, 2019  (JP) .................................. 2019-146681

(51) Int. Cl.
*B60N 2/20* (2006.01)
*B60N 2/22* (2006.01)
*B60N 2/30* (2006.01)

(52) U.S. Cl.
CPC ............. *B60N 2/20* (2013.01); *B60N 2/2218* (2013.01); *B60N 2/22* (2013.01); *B60N 2/3002* (2013.01)

(58) Field of Classification Search
CPC ...... B60N 2/22; B60N 2/2218; B60N 2/3002; B60N 2/20
See application file for complete search history.

(56) References Cited

U.S. PATENT DOCUMENTS

| 6,805,410 B2 * | 10/2004 | Christoffel ............... B60N 2/20 297/378.12 |
| 8,146,995 B2 | 4/2012 | Kienke et al. |

(Continued)

FOREIGN PATENT DOCUMENTS

| CN | 101883697 A | 11/2010 |
| CN | 105083064 A | 11/2015 |

(Continued)

OTHER PUBLICATIONS

The extended European search report issued by the European Patent Office on May 19, 2022, which corresponds to European Patent Application No. 20850103.1-1012 and is related to U.S. Appl. No. 17/604,967.

(Continued)

*Primary Examiner* — Syed A Islam
(74) *Attorney, Agent, or Firm* — Studebaker & Brackett PC

(57) ABSTRACT

Provided are a seat state switching mechanism which can achieve switching between a walk-in state and a reclining state even with a small number of components, and a seat including the seat state switching mechanism. A seat state switching mechanism is a mechanism which can switch a state of a seatback between a walk-in state and a reclining state, the seat state switching mechanism including: a movable bracket tiltable together with the seatback; a locking member for locking the movable bracket at a predetermined walk-in locking position: and an input member, a first biasing member, and a second biasing member, each composing a releaser, for switching the state of the seatback to (Continued)

the reclining state by releasing a biased state of the locking member in receipt of a reclining operation force.

16 Claims, 15 Drawing Sheets

(56) References Cited

U.S. PATENT DOCUMENTS

| | | | | |
|---|---|---|---|---|
| 10,427,576 B2 * | 10/2019 | Nozue | ........... | B60N 2/2356 |
| 10,625,635 B1 * | 4/2020 | Veine | ........... | B60N 2/3011 |
| 2004/0256900 A1 | 12/2004 | Kammerer | | |
| 2006/0119158 A1 | 6/2006 | Haverkamp | | |
| 2010/0141007 A1 | 6/2010 | Kienke et al. | | |
| 2010/0244524 A1 | 9/2010 | Kumazaki et al. | | |
| 2015/0336484 A1 | 11/2015 | Kimura et al. | | |

FOREIGN PATENT DOCUMENTS

| | | |
|---|---|---|
| CN | 109606213 A | 4/2019 |
| DE | 10 2004 056507 B3 | 11/2005 |
| JP | 2010-012810 A | 1/2010 |
| JP | 2010-132069 A | 6/2010 |
| JP | 2015-123910 A | 7/2015 |
| JP | 2017-214020 A | 12/2017 |
| JP | 6318611 B2 | 5/2018 |
| WO | 2013/027798 A1 | 2/2013 |

OTHER PUBLICATIONS

International Search Report issued in PCT/JP2020/027959; mailed Sep. 29, 2020.

An Office Action mailed by China National Intellectual Property Administration on Feb. 7, 2024, which corresponds to Chinese Patent Application No. 202080030491.8 and is related to U.S. Appl. No. 17/604,967; with English language translation.

* cited by examiner

SEAT STATE SWITCHING MECHANISM AND SEAT PROVIDED WITH SAID SEAT STATE SWITCHING MECHANISM

TECHNICAL FIELD

The present invention relates to a seat state switching mechanism and a seat including the seat state switching mechanism.

BACKGROUND ART

Various seat state switching mechanisms have been conventionally proposed for seats for vehicles to be adaptable to each switch a seatback tiltable in a front-rear direction of the seat between a walk-in state of locking the seatback at a walk-in position at a predetermined tilt angle and a reclining state of allowing the seatback to lean to a frontmost position.

A seat state switching mechanism described in Patent Literature 1 includes: as shown in FIGS. 14 to 15, a cushion frame 51 fixedly attached to a flame of a seat cushion of a seat; a seatback frame 52 fixedly attached to a frame of a seatback so as to be tiltably rotatable about a tilt shaft 52a; a lever 53; a link 54; a stopper 55; and a rotational member 61. The rotational member 61 is fixedly attached to the seatback frame 52.

The lever 53 is swingably supported by a pin 56 fastened to the cushion frame 51. The lever 53 has a lower end connected to a strap 59. The strap 59 is pulled in a left direction in FIGS. 14 to 15 in a reclining operation to thereby allow the lever 53 to swing in a clockwise direction.

The stopper 55 is supported on a pin 58 fastened to the cushion frame 51 swingably thereabout in an up-down direction. The stopper 55 is biased upward by an unillustrated spring to fit in a recess 61a of the rotational member 61 at an upper position. The stopper 55 is provided with a pin 57 inserted in a slit 51a of the cushion frame 51 and guided in the tip-down direction. Besides, the pin 57 is inserted in a slit 53a of the lever 53 having a bent shape, and the movement thereof in the up-down direction is restricted depending on a tilt position of the lever 53. The link 54 is supported on the pin 58 swingably thereabout in the up-down direction. The link 54 has one end (a left end in FIGS. 14 to 15) connected to a slide cable 60 operable to release a slide locking mechanism of the seat. The link 54 has another end (a right end in FIGS. 14 to 15) formed with a protrusion 54a protruding to reach and come into contact with a pin 62 provided in the rotational member 61 when the rotational member 61 rotates.

The seat state switching mechanism configured in the above-described manner releases the tilt restriction of the seatback by manipulating a lever for a walk-in operation provided at a shoulder of the seat and operating an unillustrated reclining device in shifting from a normal sittable state to a walk-in state. Then, tilting of the seatback frame 52 as shown in FIG. 15 makes the stopper 55 fit in the recess 61a of the rotational member 61. Consequently, each of the seatback frame 52 and the seatback are locked at the walk-in position at a predetermined angle. At this time, the protrusion 54a of the link 54 is pushed by the pin 62 of the rotational member 61, and the link 54 rotates in the clockwise direction to thereby pull the slide cable 60, which results in releasing the slide locking mechanism.

In the shifting from the walk-in state to the reclining state, pulling the strap 59 to swing the lever 53 in the clockwise direction disengages the stopper 55 and the rotational member 61 from each other. This achieves the reclining state. In this manner, the seatback frame 52 and the seatback can further tilt from the walk-in position. When the pin 62 of the rotational member 61 having passed through the protrusion 54a of the link 54 stops pushing the protrusion 54a, the link 54 and the slide cable 60 return to their respective initial positions and the slide locking mechanism is restored to the locking state.

However, the seat state switching mechanism disclosed in Patent Literature 1 needs a member (e.g., a manipulation lever, an operation force transmission member, and a mechanism for releasing the tilt restriction of the reclining device) for the shifting to the walk-in state, and another member (e.g., the stopper 55, the rotational member 61, and the lever 53) for the shifting from the walk-in state to the reclining state. Therefore, the seat state switching mechanism has a problem that it is difficult to reduce the number of components of the seat state switching mechanism, and accordingly the switching mechanism has a complicated structure.

CITATION LIST

Patent Literature

Patent Literature 1: Japanese patent No. 6318611

SUMMARY OF INVENTION

An object of the present invention is to provide a seat state switching mechanism which is capable of switching between a walk-in state and a reclining state with a smaller number of components, and a seat including the seat state switching mechanism.

To achieve the object, a seat state switching mechanism, according to the present invention is a seat state switching mechanism for switching a state of a seatback tiltable in a front-rear direction of a seat between a walk-in state of locking the seatback at a walk-in position at a predetermined tilt angle and a reclining state of releasing the locking and allowing the seatback to lean to a frontmost position. The seat state switching mechanism includes: a movable bracket fixedly attached to the seatback and being tiltable together with the seatback; a locking member for locking the movable bracket at a predetermined walk-in locking position so that the seatback reaches the walk-in position when the movable bracket tilts through a walk-in operation; and a releaser for releasing the locking of the locking member in receipt of a reclining operation force through a reclining operation and switching the state of the seatback to the reclining state.

A seat according to the present invention having the seat state switching mechanism includes: the seatback; a seat state switching mechanism provided on one side of the seatback in a width direction thereof and serving as the seat state switching mechanism, and an existing seat state switching mechanism provided on the other side of the seatback in the width direction thereof, and having a reclining locking operability for locking the seatback at an initial tilt angle and placing the seatback in a reclining locking state, a reclining, operability for placing the seatback in the reclining state in receipt of the reclining operation force, and a walk-in operability for placing the seatback in the walk-in state in receipt of a walk-in operation force; a reclining operation force transmission part for transmitting the reclining operation force to the seat state switching mechanism and the existing seat state switching mechanism; and a walk-in operation force transmission part for transmitting the walk-in operation force to the existing seat state switching mechanism.

DESCRIPTION OF EMBODIMENTS

Hereinafter, a preferable embodiment of the present invention will be described with reference to the accompanying drawings.

Figure 1:
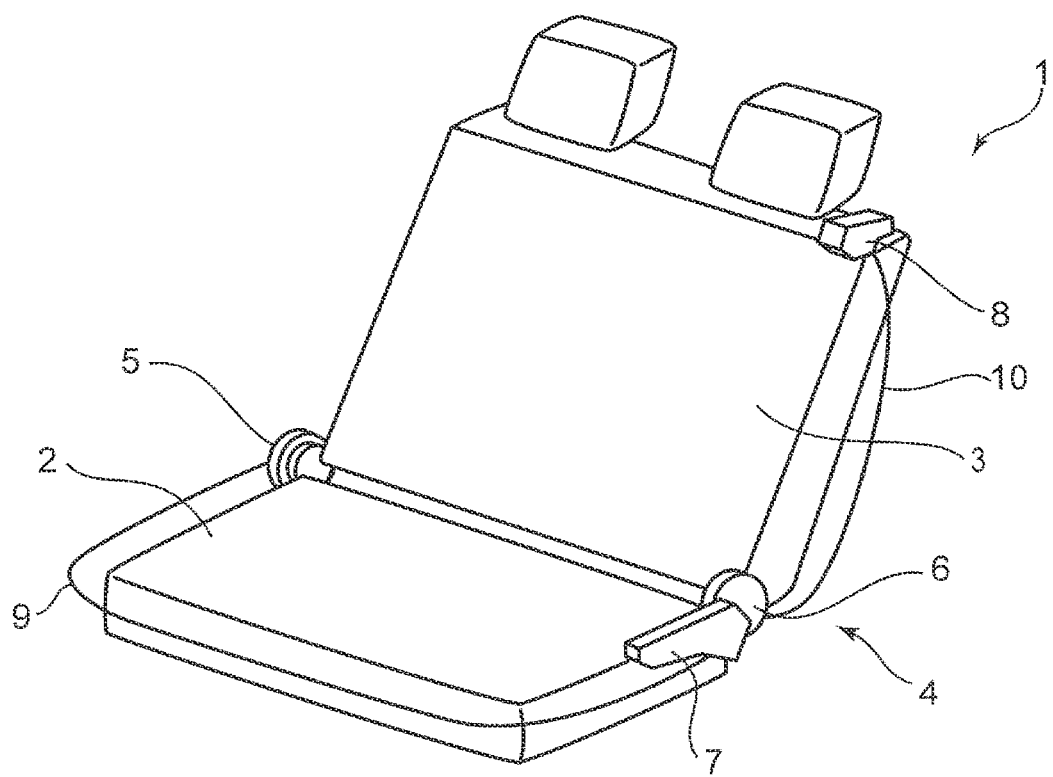
FIG. 1 is a perspective view schematically showing an overall structure of a seat including a seat state switching mechanism according to an embodiment of a seat state switching mechanism of the present invention as provided on one side of a seat, and an existing seat state switching mechanism serving as another seat state switching mechanism as provided on the other side of the seat.

A seat 1 illustrated in FIG. 1 is a seat which is long in a vehicle width direction and constitutes a rear seat of a vehicle. The seat 1 includes a seat state switching mechanism 5 (a first seat state switching mechanism) and an existing seat state switching mechanism 6 (a second seat state switching mechanism) on the opposite sides of a seatback 3 in a width direction thereof respectively. The seat 1 further includes a reclining manipulation lever 7 and a walk-in manipulation lever 8 on the side (right side in FIG. 1) of the seatback 3 in the width direction thereof where the existing seat state switching mechanism 6 is provided.

Specifically, the seat 1 includes: a seat cushion 2; the seatback 3 tiltable in a front-rear direction of the seat 1; the seat switching mechanism 5 provided on the one side (left side in FIG. 1) of the seat back 3 in the width direction thereof; the existing seat state switching mechanism 6 provided on the other side of the seat back 3 in the width direction thereof; a reclining operation three transmission part; and a walk-in operation force transmission part.

Each of the seat state switching mechanism 5 and the existing seat state switching mechanism 6 is operable and configured to switch a state of the seatback between a walk-in state of locking the seatback 3 at a walk-in position at a predetermined tilt angle and a reclining state of releasing the locking and allowing the seatback 3 to lean to a frontmost position. A specific configuration of the seat state switching mechanism 5 will be descried in detail later.

The reclining operation force transmission part is configured to transmit a reclining operation force, which is an operation force for shifting to the reclining state, to each of the seat state switching mechanism 5 and the existing seat state switching mechanism 6. Specifically, the reclining operation force transmission part includes the reclining manipulation lever 7 and a reclining operation force transmission cable 9.

The reclining manipulation lever 7 is provided on the other side of the seatback 3, i.e., on the side (right side in FIG. 1) where the existing seat state switching mechanism 6 is provided. The reclining manipulation lever 7 serves as a reclining operation force input section for receiving an input of the reclining operation force and adapted to transmit the reclining operation force to the existing seat state switching mechanism 6 via a cable or a link. The reclining operation force transmission cable 9 serves as a transmission member for transmitting the reclining operation force from the reclining manipulation lever 7 to the seat state switching mechanism 5.

The walk-in operation force transmission part is configured to transmit a walk-in operation force for shifting to the walk-in state to the existing seat state switching mechanism 6 or the reclining mechanism. Specifically, the walk-in operation force transmission part includes the walk-in manipulation lever 8 and a walk-in operation force transmission cable 10 for transmitting the operation force input to the walk-in manipulation lever 8 to the existing seat state switching mechanism 6 or the reclining mechanism.

Hereinafter, the configuration and the operations of the seat state switching mechanism 5 will be described in more detail.

(Configuration of Seat State Switching Mechanism 5)

The seat state switching mechanism 5 is configured to switch the state of the seatback 3 between a walk-in state of locking the seatback at a walk-in position at a predetermined tilt angle (such an angle at which the seatback 3 leans forward for allowing a person to easily get into and out of a space in the rear of the seatback 3) and a reclining state of releasing the locking and allowing the seatback 3 to lean to a frontmost position (such a position substantially parallel to the seat cushion 2).

Figure 2:
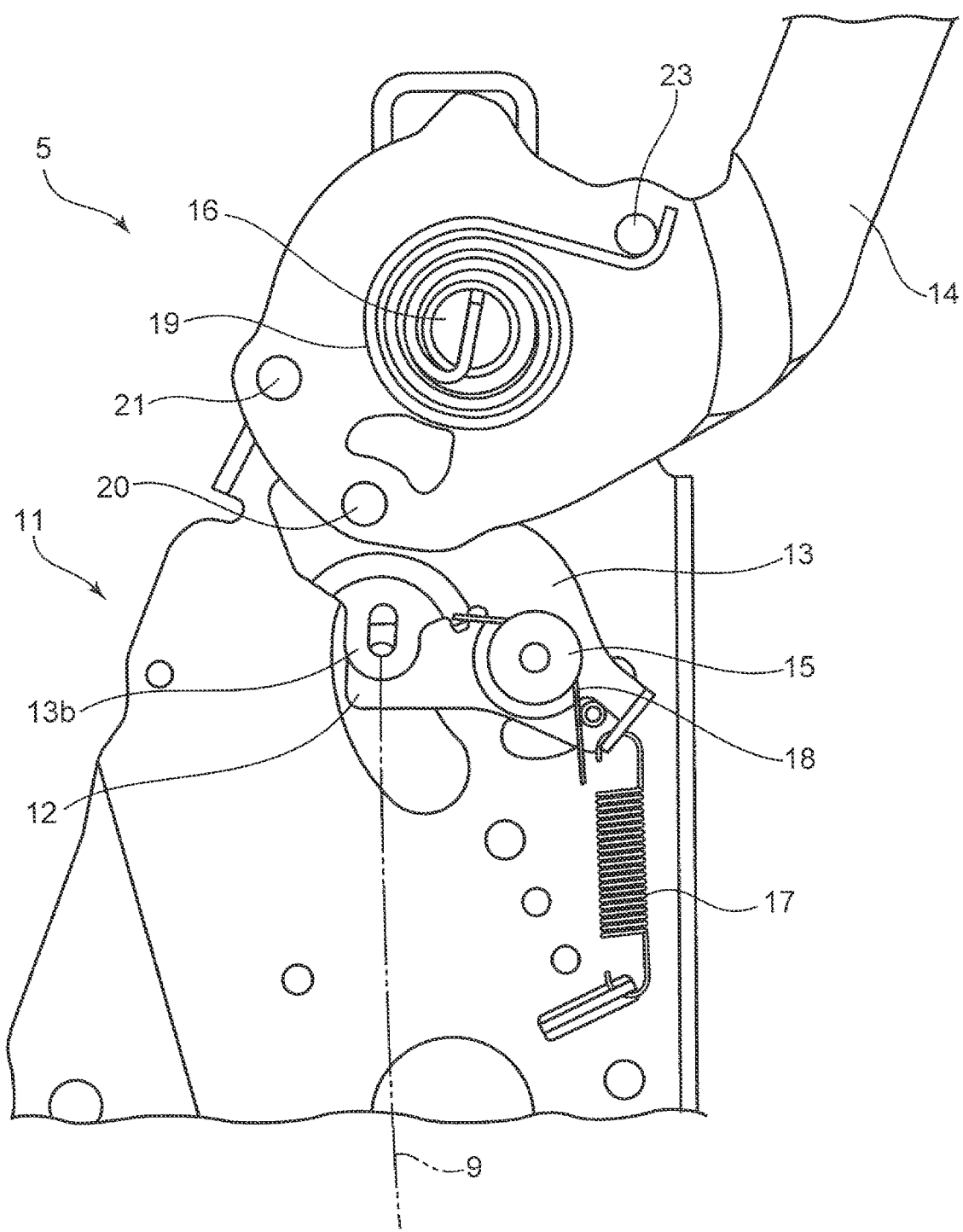
FIG. 2 is a front view showing a main configuration of the seat state switching mechanism in FIG. 1.
Figure 3:
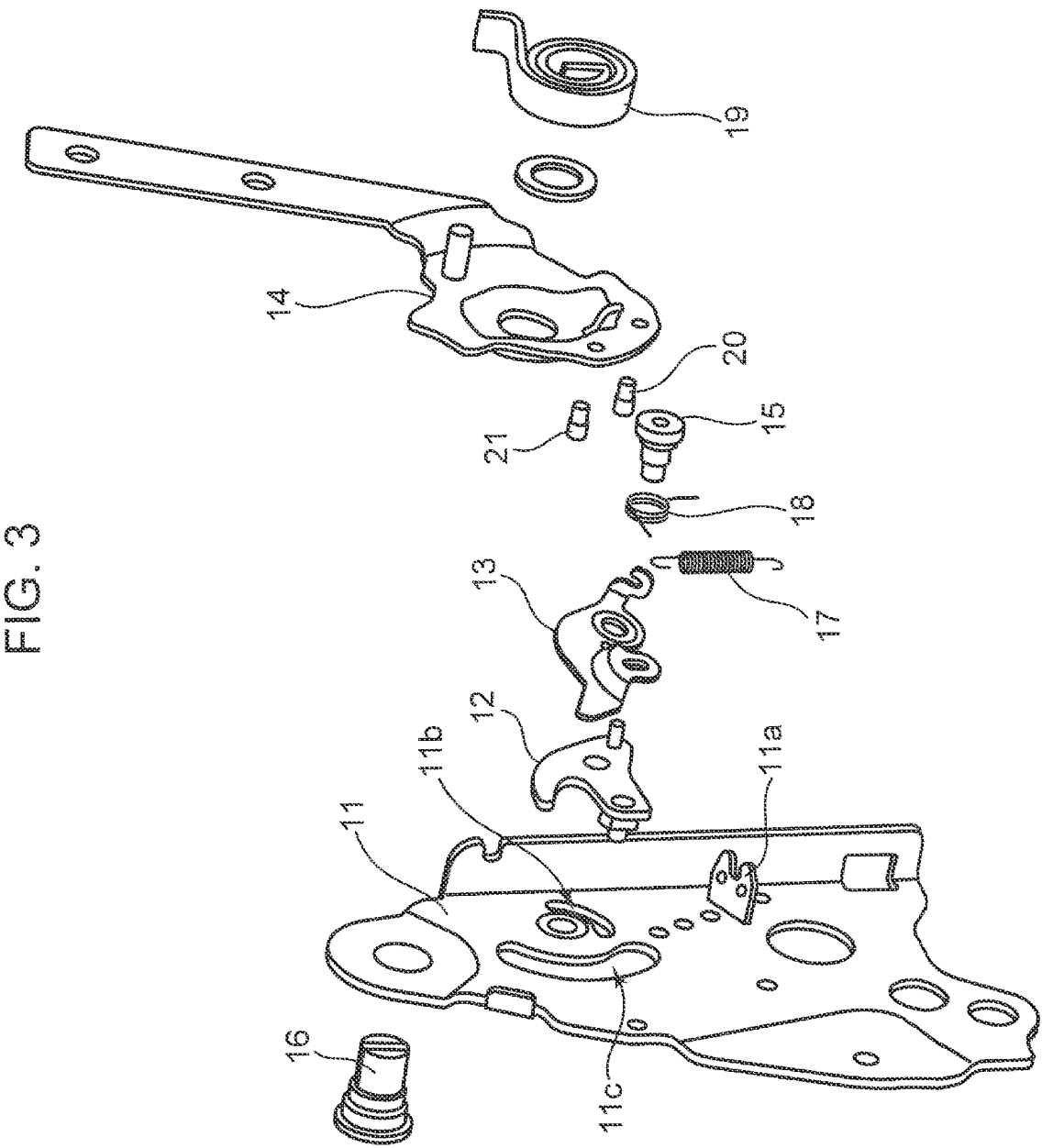
FIG. 3 is an exploded perspective view of the seat state switching mechanism in FIG. 2.

Specifically, as shown in FIGS. 2 to 3, the seat state switching mechanism 5 includes: a base member 11 fixedly attached to the seat cushion 2 (see FIG. 1, specifically attached to a frame supporting the seat cushion 2); a locking member 12, an input member 13, and a movable bracket 14 each serving as a movable member rotatably attached to the base member 11; a tension coil spring 17 (a second biasing member) for biasing the input member 13 in a clockwise direction when viewed in FIG. 2; and a torsion coil spring 18 (a first biasing member) for biasing the locking member 12 in a counter-clockwise direction when viewed in FIG. 2.

Figure 4:
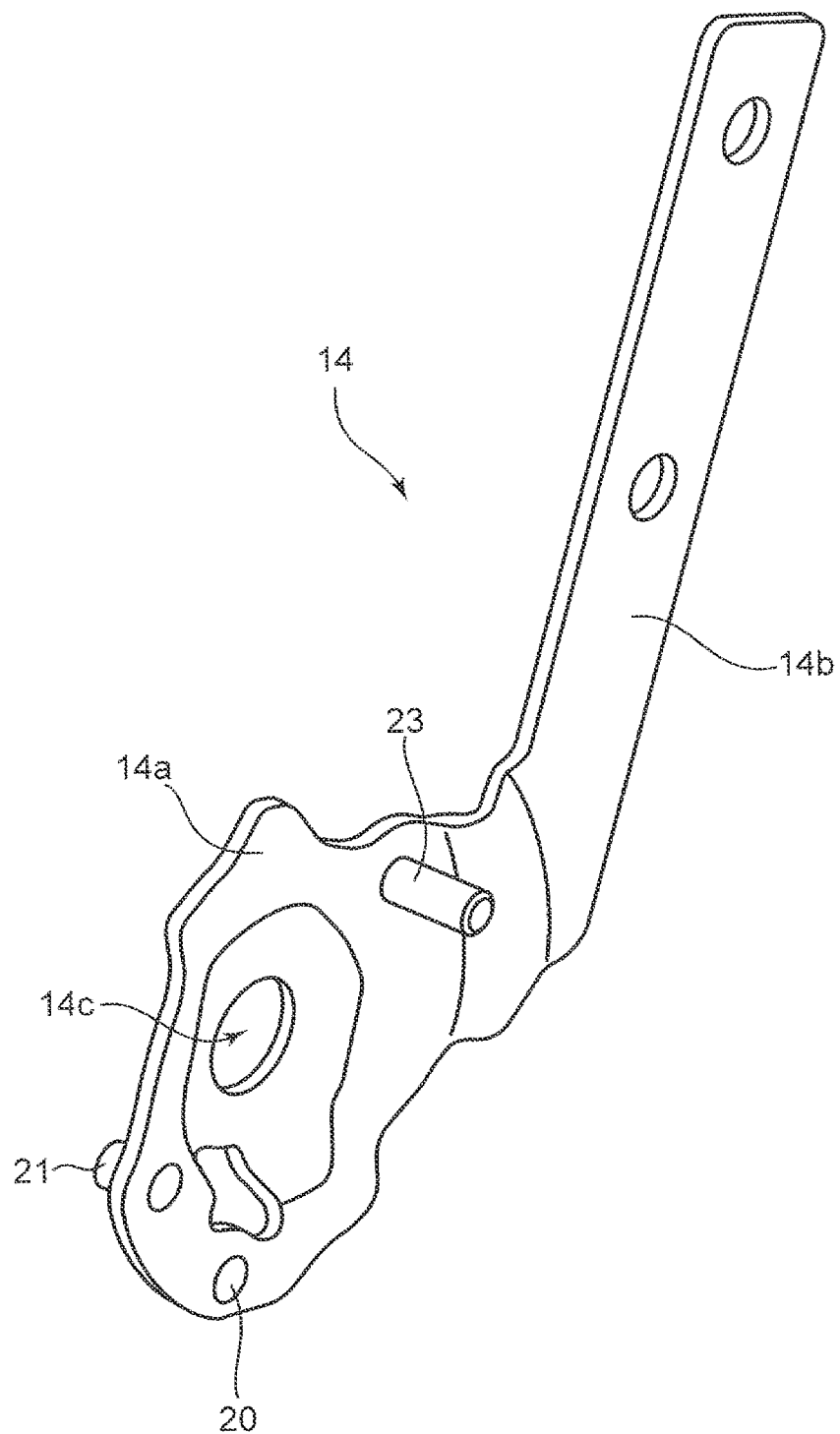
FIG. 4 is a perspective view of a movable bracket in FIG. 3.

The movable bracket 14 is fixedly attached to a side surface of the seatback 3 and configured to be tiltable together with the seatback 3. Specifically, the movable bracket 14 has a main body 14a formed with a through hole 14c and an arm 14b as shown in FIG. 4. The arm 14b has a lower end connected to the main body 14a. The main body 14a and the arm 14b are integrated. The arm 14b is fastened to the side surface of the seatback 3 with, for example, a screw. A first pin 20 and a second pin 2 are fastened to the main body 14a around the through hole 14c. The first pin 20 and the second pin 21 extend in parallel to a shaft member 16 horizontally extending through the through hole 14c, which will be described later.

As shown in FIGS. 2 to 3, the movable bracket 14 is rotatably supported on the shaft member 16 fixedly attached to an upper part of the base member 11 so as to horizontally extend and inserted in the through hole 14c. Further, the shaft member 16 receives a swirl spring 19 wound thereon. The swirl spring 19 has an outer end engaging with the pin 23 provided to the movable bracket 14. Therefore, the movable, bracket 14 is biased with a rotational biasing force of the swirl spring 19 in a direction (the counter-clockwise direction in FIG. 2) corresponding to the forward direction of the seat 1 in which the movable bracket leans together with the seatback 3 to the front of the seat 1.

The first pin 20 and the second pin 21 of the movable bracket 14 are arranged so that the first pin 20 reaches the locking member 12 earlier than the second pin 21 when the movable bracket 14 leans forward (rotates in the counter-clockwise direction in FIG. 2). The first pin 20 in the embodiment serves as an abutment part which abuts the locking member 12 when the movable bracket 14 tilts.

Figure 5:
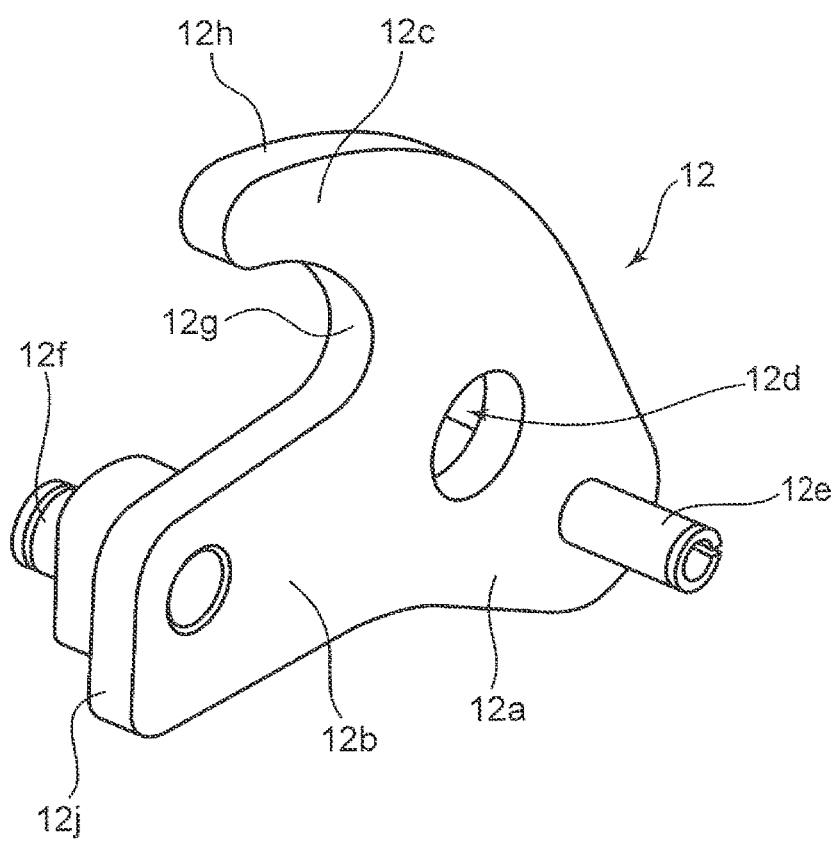
FIG. 5 is a perspective view of a locking member in FIG. 3.

The locking member 12 is configured to lock the movable bracket 14 at a predetermined walk-in locking position so that the seatback 3 reaches a walk-in position when the movable bracket 14 tilts. Specifically, the locking member 12 includes a main body 12a having a through hole 12d, and an arm 12b and a hook 12c extending different directions from the main body 12a as shown in FIG. 5.

The main body 12a is provided with a pin 12e penetrating the main body 12a. The pin 12e has one end (an end located in the depth of the sheet in FIG. 5) inserted in a slit 11b of the base member 11 having a curving shape (see FIG. 3) for regulating a rotatable range of the locking member 12. The pin 12e has the other end (an end at the front of the sheet in FIG. 5) engaged with one end of the opposite ends of the torsion coil spring 18 (see FIG. 3) from below.

The hook 12c has a bent shape, specifically, has a recess 12g (engagement part) and an outer peripheral surface 12h. In the walk-in state of the seat state switching mechanism 5 (see FIGS. 11 to 13), the recess 12g is engageable with the first pin 20 of the movable bracket 14. Conversely, in the reclining state (see FIGS. 8 to 10), the outer peripheral surface 12h comes into contact with the first pin 20 and the locking member 12 is pushed downward, and hence the first pin 20 does not engage with the recess 12g.

The arm 12b of the locking member 12 has an end provided with a pin 12f. The pin 12f is inserted in a slit 11c of the base member 11 having a curving shape (see FIG. 3). The pin. 12f is coupled to a certain portion, via a cable or the like, for releasing locking of the slide mechanism (not shown) for sliding the seat 1 in the front-rear direction. The pin 12f rises as the locking member 12 rotates in the clockwise direction in the shifting to the walk-in state where the locking member 12 engages with the first pin 20, thereby releasing the locking of the slide mechanism.

The seat state switching mechanism 5 according to the embodiment has a releaser for releasing a biasing state of the locking member 12 (i.e., locking of the locking member 12) and switching to the reclining state in receipt of a reclining operation force via the reclining manipulation lever 7 and the reclining operation force transmission cable 9. The releaser is composed of the input member 13, the torsion coil spring 18 (first biasing member), and the tension coil spring 17 (second biasing member).

The input member 13 receives an input of the reclining operation force by the manipulation lever 7 via the reclining operation force transmission cable 9. The input member 13 holds the locking member 12 at the locking position (c.f., the walk-in state in FIGS. 11 to 13) for locking the movable bracket 14 at the walk-in locking position in no receipt of the reclining operation, and releases the holding of the locking member 12 (c.f., the reclining state in FIGS. 8 to 10) in receipt of the reclining operation force.

Figure 6:
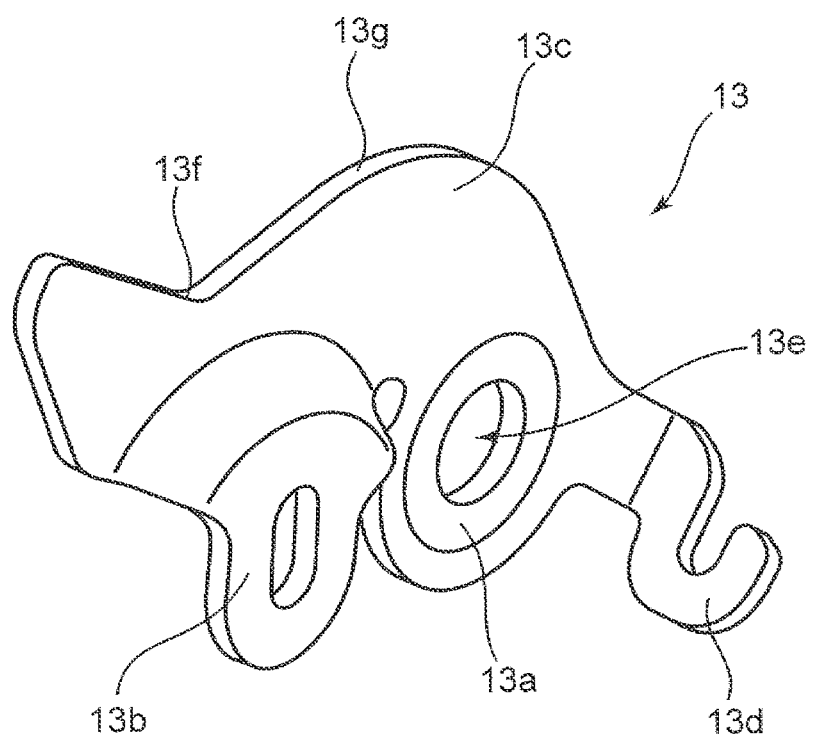
FIG. 6 is a perspective view of an input member in FIG. 3.

Specifically, as shown in FIG. 6, the input member 13 includes: a main body 13a having a through hole 13e; a cable linkage 13b linked to the reclining operation force transmission cable 9; a bulging part 13c bulging in a mountain shape; and a spring engagement part 13d having a hook shape or hole shape for receiving the tension coil spring 17 to be engaged therewith. The bulging part 13c has an outer peripheral surface composed of a straight section 13f and a bulging section 13g for respectively receiving the first pin 20 and the second pin 21 of the movable bracket 14 which abut the sections. The cable linkage 13b and the spring engagement part 13d are located on both side of the through hole 13e.

Figure 7:
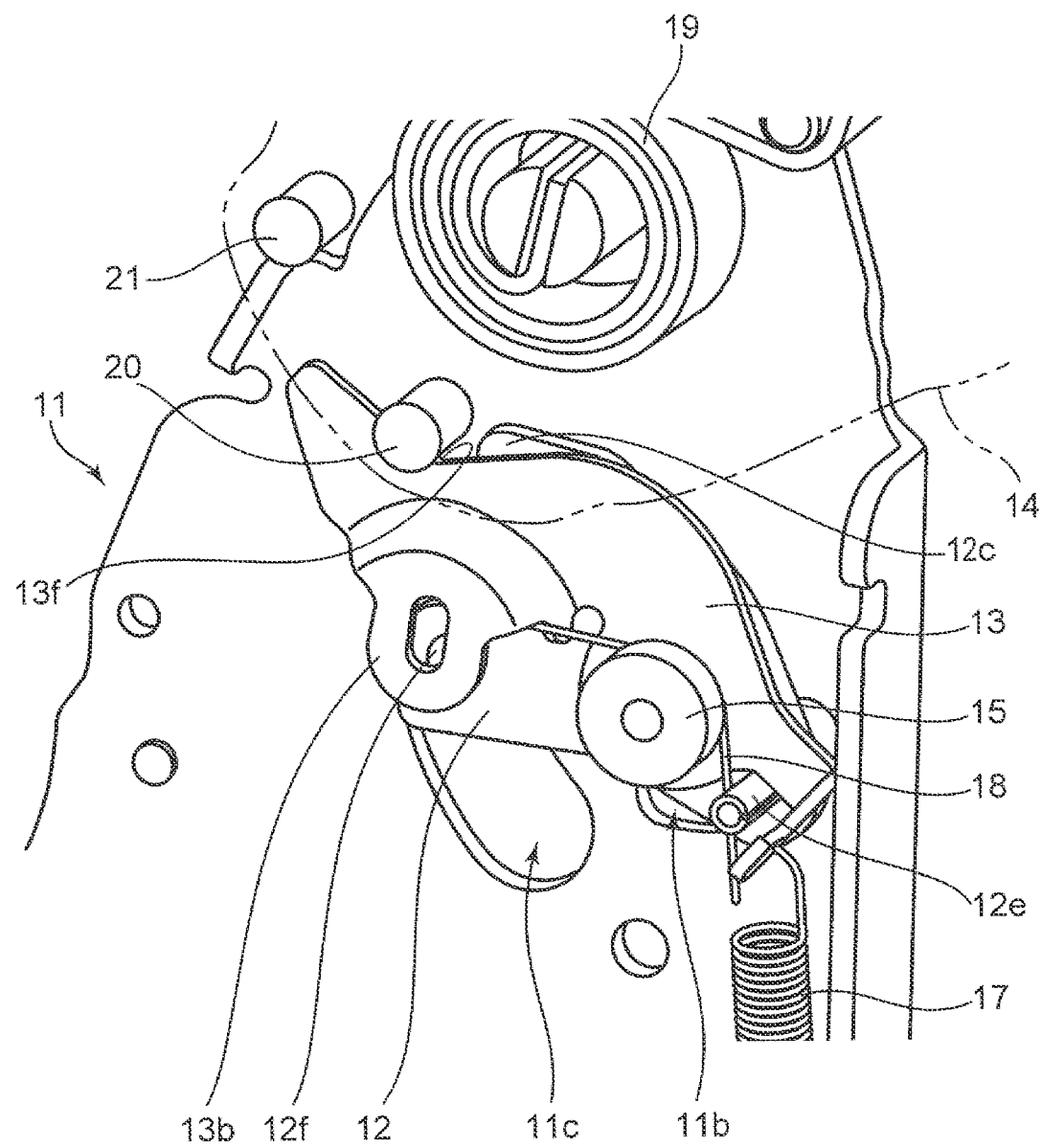
FIG. 7 is a perspective explanatory view showing a first pin and a second pin of the movable bracket, the locking member, the input member, and therearound in the seat state switching mechanism in FIG. 2.

As shown FIG. 3 and FIG. 7, the input member 13 is rotatably supported about a support shaft in common with the locking member 12, i.e., about a shaft member 15 fixedly attached to the base member 11 so as to horizontally extend. The input member 13 and the locking member 12 are supported about the shaft member 15 to be rotatable independently of each other even in a mutually overlapped state.

The tension coil spring 17 has the opposite ends to be engaged with the spring engagement part 13d of the input member 13 and with a spring engagement part 11a of the base member 11 respectively (see FIG. 3). The engagement makes the tension coil spring 17 bias the input member 13 in the clockwise direction rotatably about the shaft member 15 (see FIG. 7). Specifically, the input member 13 is biased by the tension coil spring 17 (second biasing member) from the releasing position for releasing the locking of the locking member 12 by the input member 13 to the holding position for holding the locking member 12.

Moreover, due to the engagement of the opposite ends of the torsion coil spring 18 with the cable linkage 13b of the input member 13 and the pin 12e of the locking member 12 respectively, the locking member 12 is biased by the torsion coil spring 18 in the counter-clockwise direction rotatably about the shaft member 15. Specifically, the locking member 12 is biased by the torsion coil spring 18 (first biasing member) from the locking position (walk-in locking position) of the locking member 12 to the lock releasing position (reclining position). In this state, the pin 12e of the locking member 12 is pinched between the end of the torsion coil spring 18 and the lower surface of the input member 13, and hence the locking member 12 is rotatable by following the rotation of the input member 13.

Accordingly, the locking member 12 is arranged at such a position as to lock the movable bracket 14 at the walk-in locking position in no receipt of the reclining operation force by the input member 13 in the releaser.

(Operations of Seat State Switching Mechanism 5)

<Operation of Shifting to Reclining State>

Figure 8:
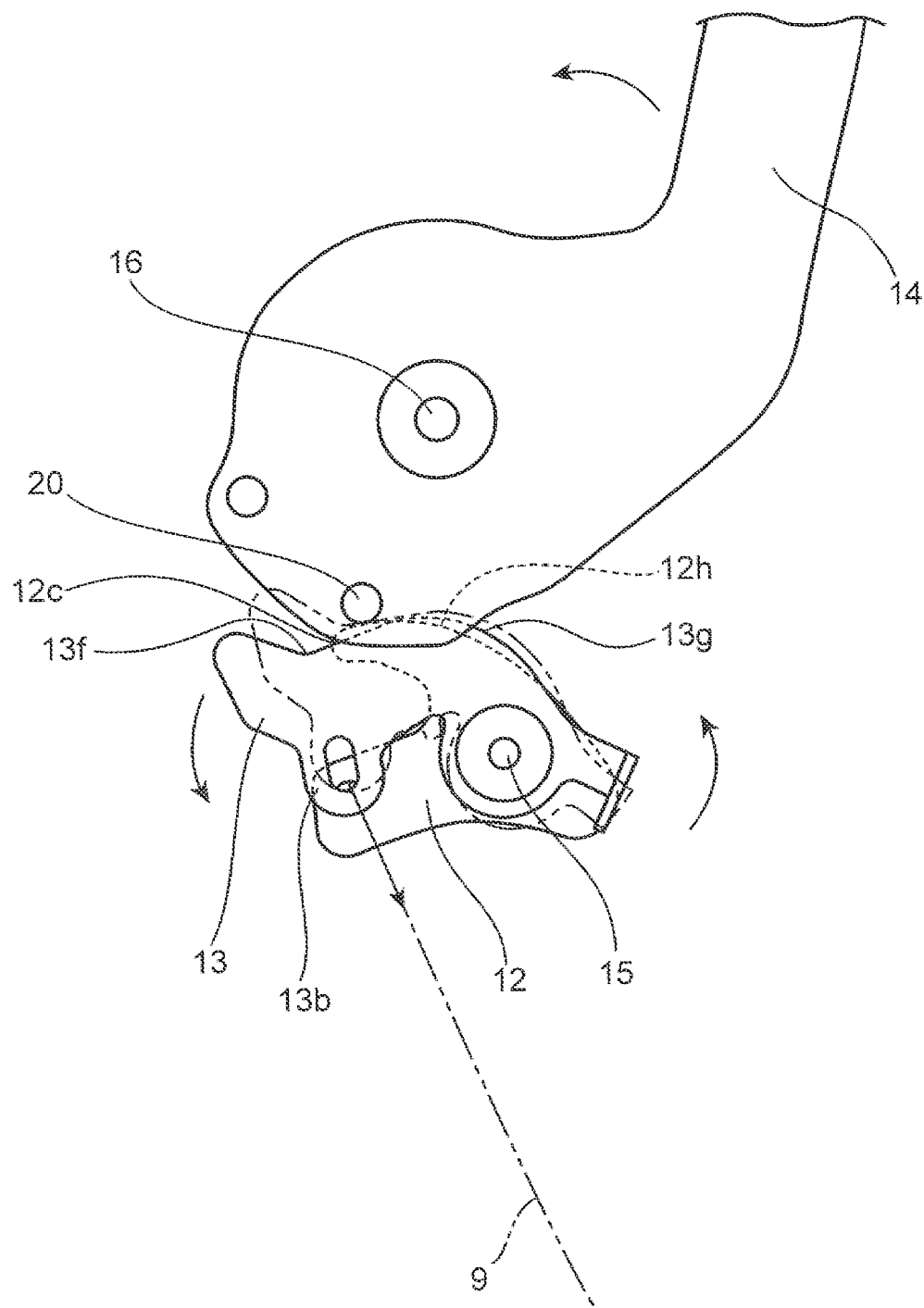
FIG. 8 is an explanatory view explaining an operation of the seat state switching mechanism in FIG. 2 for shifting to a reclining state.
Figure 9:
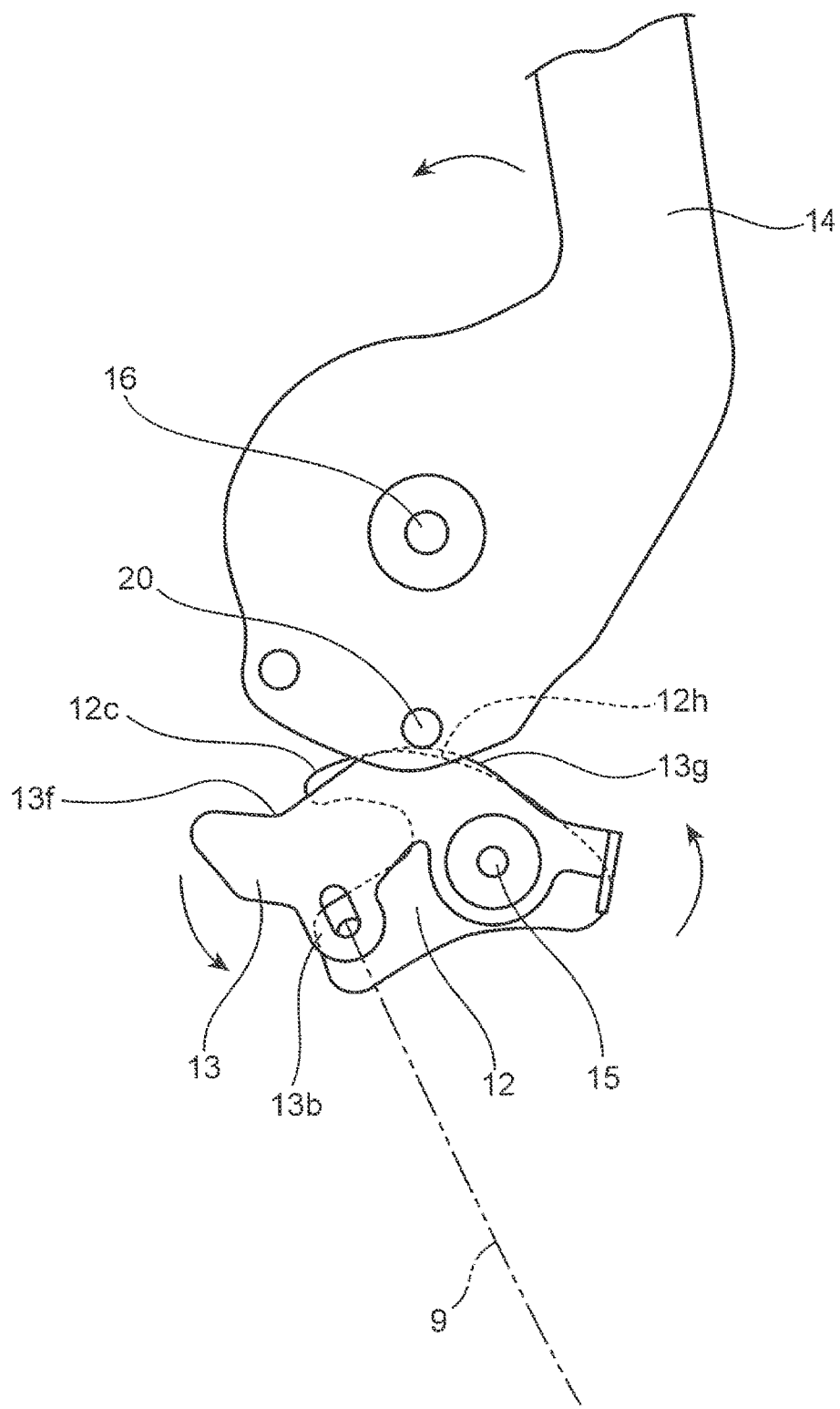
FIG. 9 is an explanatory view explaining the operation of the seat state switching mechanism in FIG. 2 for shifting to the reclining state.
Figure 10:
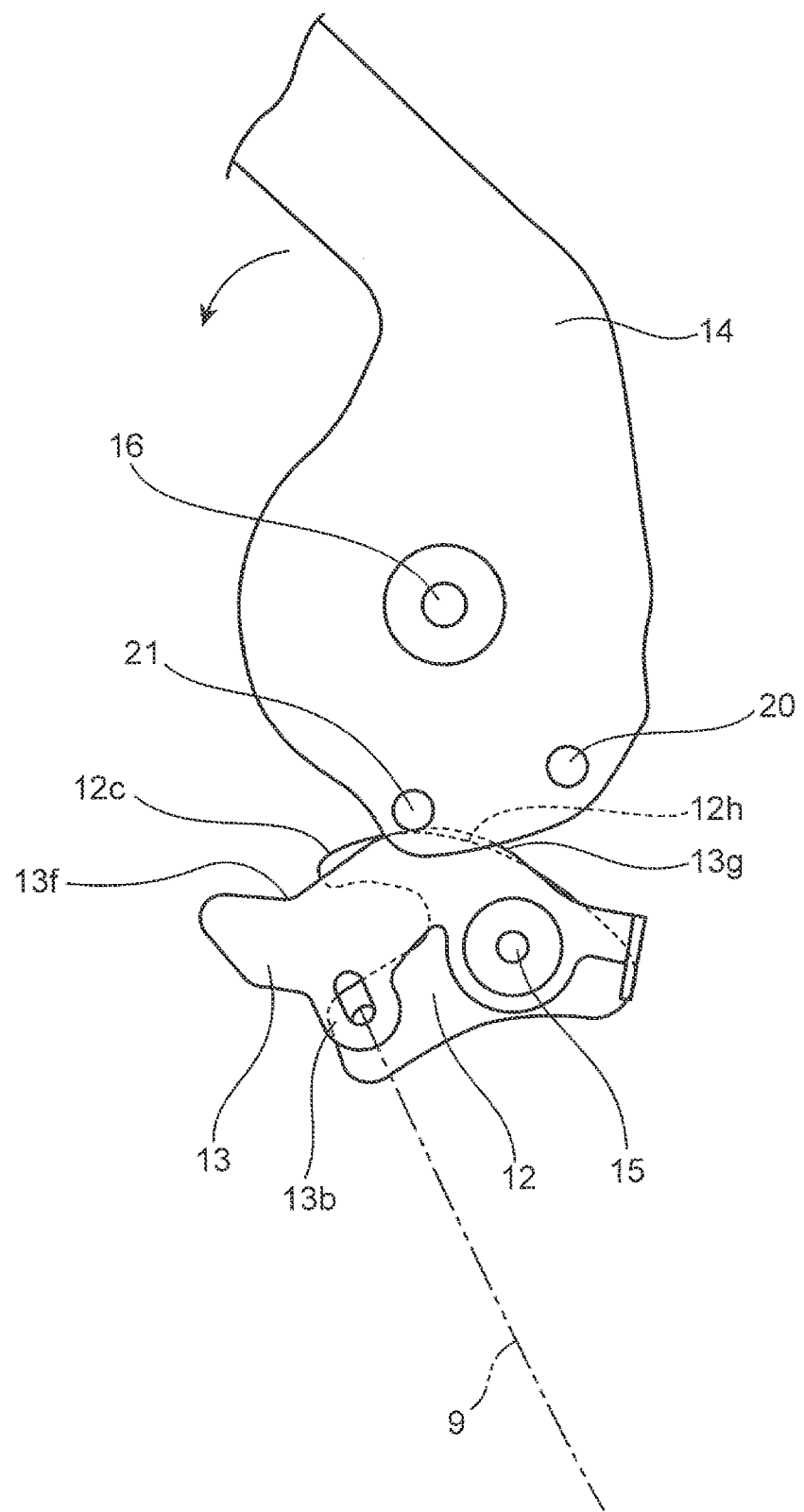
FIG. 10 is an explanatory view explaining an operation of the seat state switching mechanism in FIG. 2 for the shifting to the reclining state.

The input member 13 in the seat state switching mechanism 5 having the above-described configuration receives an input of a reclining operation force by the manipulation lever 7 via the reclining operation force transmission cable 9, as shown in FIGS. 8 to 10, in shifting from an initial state where the seat 1 shown in FIG. 1 is sittable to a reclining state (i.e., a state where the seatback 3 can lean to a frontmost position near the seat cushion 2). At this time, the seat 1 is released from the reclining locking, and the seatback 3 is tiltable.

As shown in FIGS. 8 to 10, the input member 13 is pulled downward by the reclining operation force transmission cable 9. The pulled input member 13 rotates about the shaft member 15 in the counter-clockwise direction. Specifically, the input member 13 moves from the holding position for holding the locking member 12 to the releasing position against the biasing force from the tension coil spring 17 (second biasing member) in receipt of the reclining operation force.

The locking member 12 is released from the holding by the input member 13, and rotates about the shaft member 15 in the counter-clockwise direction with the biasing force from the torsion cod spring 18. At this time, the locking member 12 rotates in the counter-clockwise direction at mostly the same time as the rotation of the input member 13 by following the rotation of the input member 13.

The movable bracket 14 can lean to the frontmost position in the state where the locking member 12 rotates in the counter-clockwise direction. In other words, the movable bracket 14 tilts in the counter-clockwise direction with the biasing force from the swirl spring 19 (see FIGS. 2 to 3), and moves in the counter-clockwise direction from the initial position where the first pin 20 abuts the straight section 13$f$ of the input member 13 shown in FIGS. 8 to 19. At this time, the first pin 20 pushes the input member 13 and the locking member 12 downward while abutting the bulging section 13$g$ of the input member 13 and the outer peripheral surface 12$h$ of the hook 12$c$ of the locking member 12. Therefore, the first pin 20 does not engage with the recess 12$g$ of the locking member 12. As shown in FIG. 10, when the movable bracket 14 further tilts, the first pin 20 passes through the input member 13 and the locking member 12, and instead, the subsequent second pin 21 pushes the input member 13 and the locking member 12 downward. As a result, the movable bracket 14 and the seatback 3 are smoothly shiftable to the reclining state of allowing each of the bracket and the seatback to lean to the frontmost position.

Meanwhile, when a user manually returns the seatback 3 from the reclining state to the initial state again, the movable bracket 14 shown in FIGS. 8 to 10 rotates in the clockwise direction. Simultaneously, the first pin 20 can smoothly return to the initial position shown in FIG. 8 while abutting the bulging section 13$g$ of the input member 13 and the outer peripheral surface 12$h$ of the hook 12$c$ of the locking member 12. That is to say, a returning operation of to the initial position can be easily and reliably performed as well.

Moreover, the movable bracket 14 rotates in the clockwise direction when the seatback 3 leans backward. Simultaneously, the first pin 20 can smoothly and reliably move by abutting the straight section 13$f$ of the input member 13.

<Operation of Shifting to Walk-In State>

Figure 11:
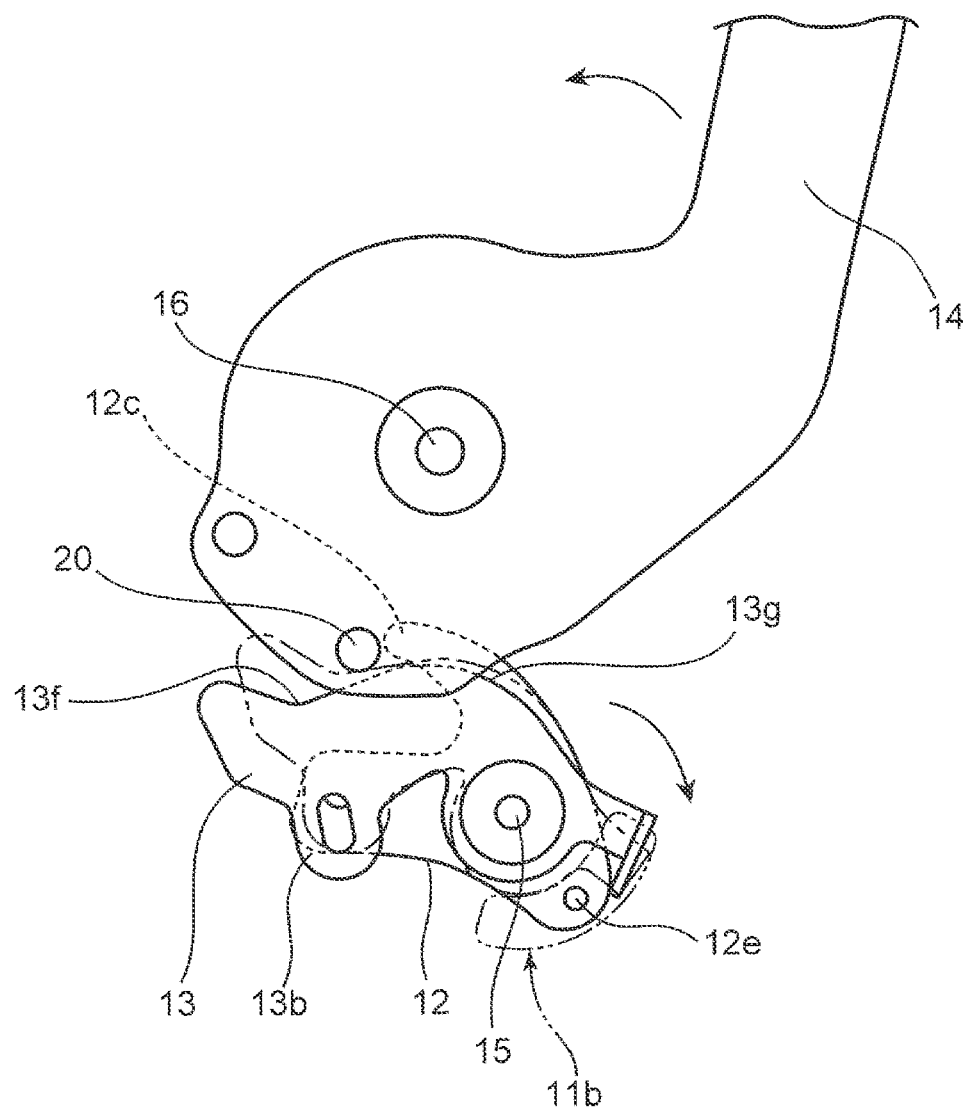
FIG. 11 is an explanatory view explaining an operation of the seat state switching mechanism in FIG. 2 for shifting to a walk-in state.
Figure 12:
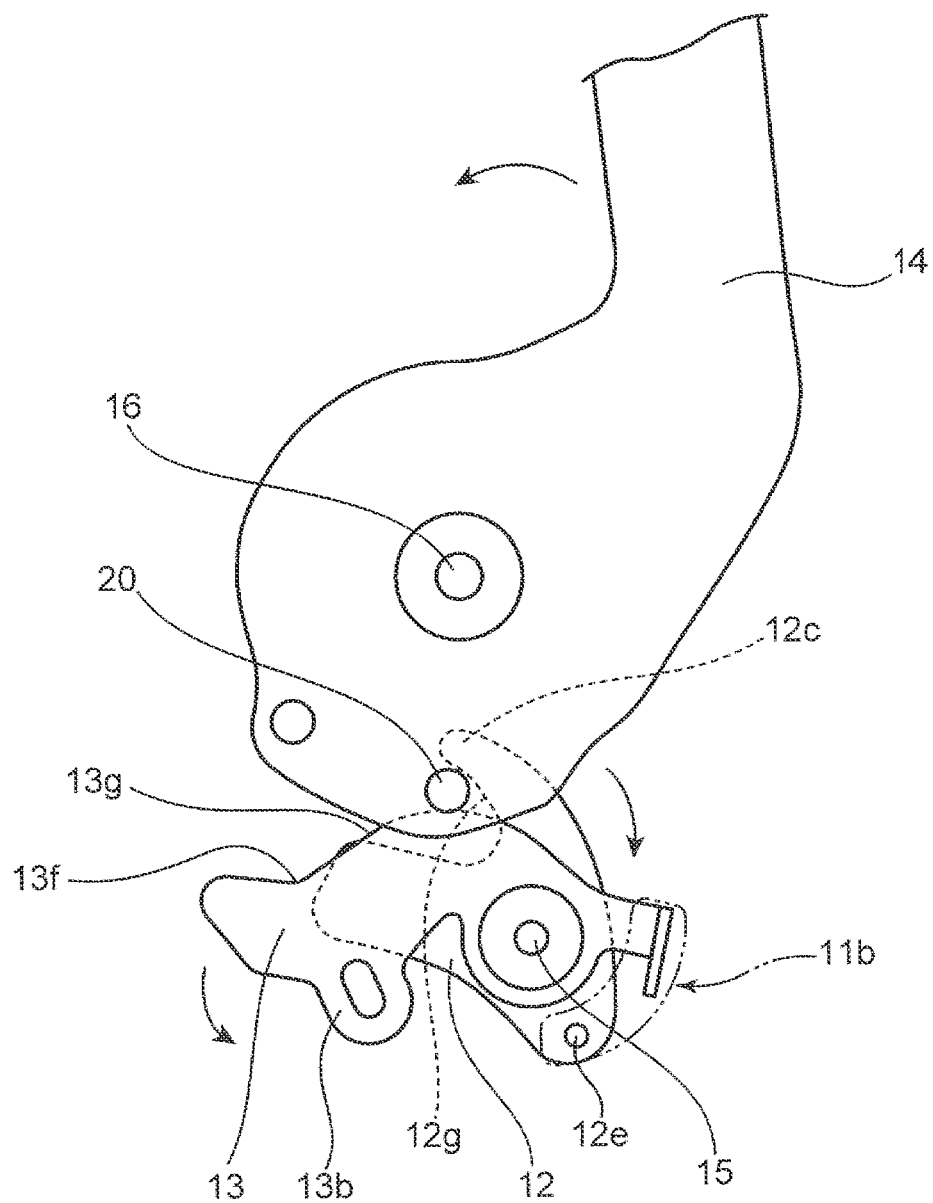
FIG. 12 is an explanatory view explaining the operation of the seat state switching mechanism in FIG. 2 for the shifting to the walk-in state.
Figure 13:
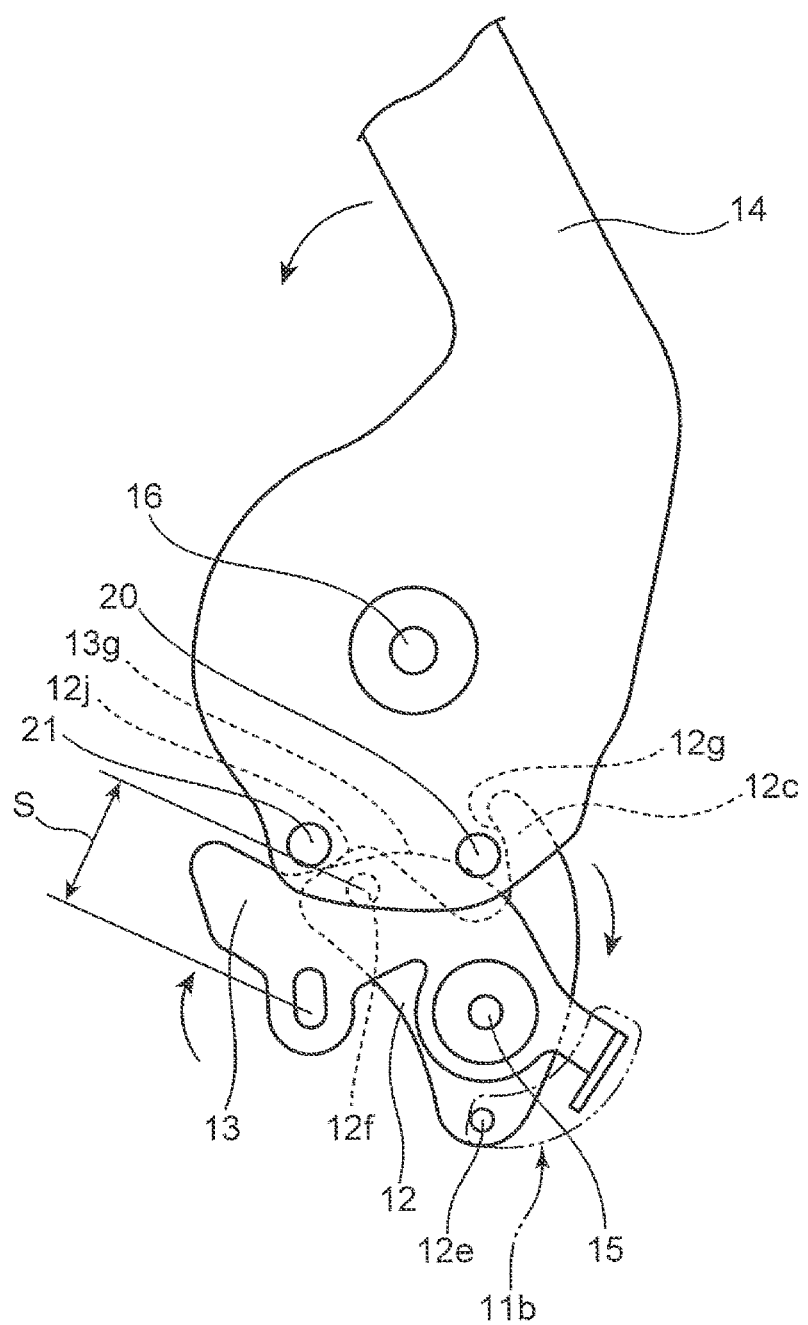
FIG. 13 is an explanatory view explaining the operation of the seat state switching mechanism in FIG. 2 for the shifting to the walk-in state.
Figure 14:
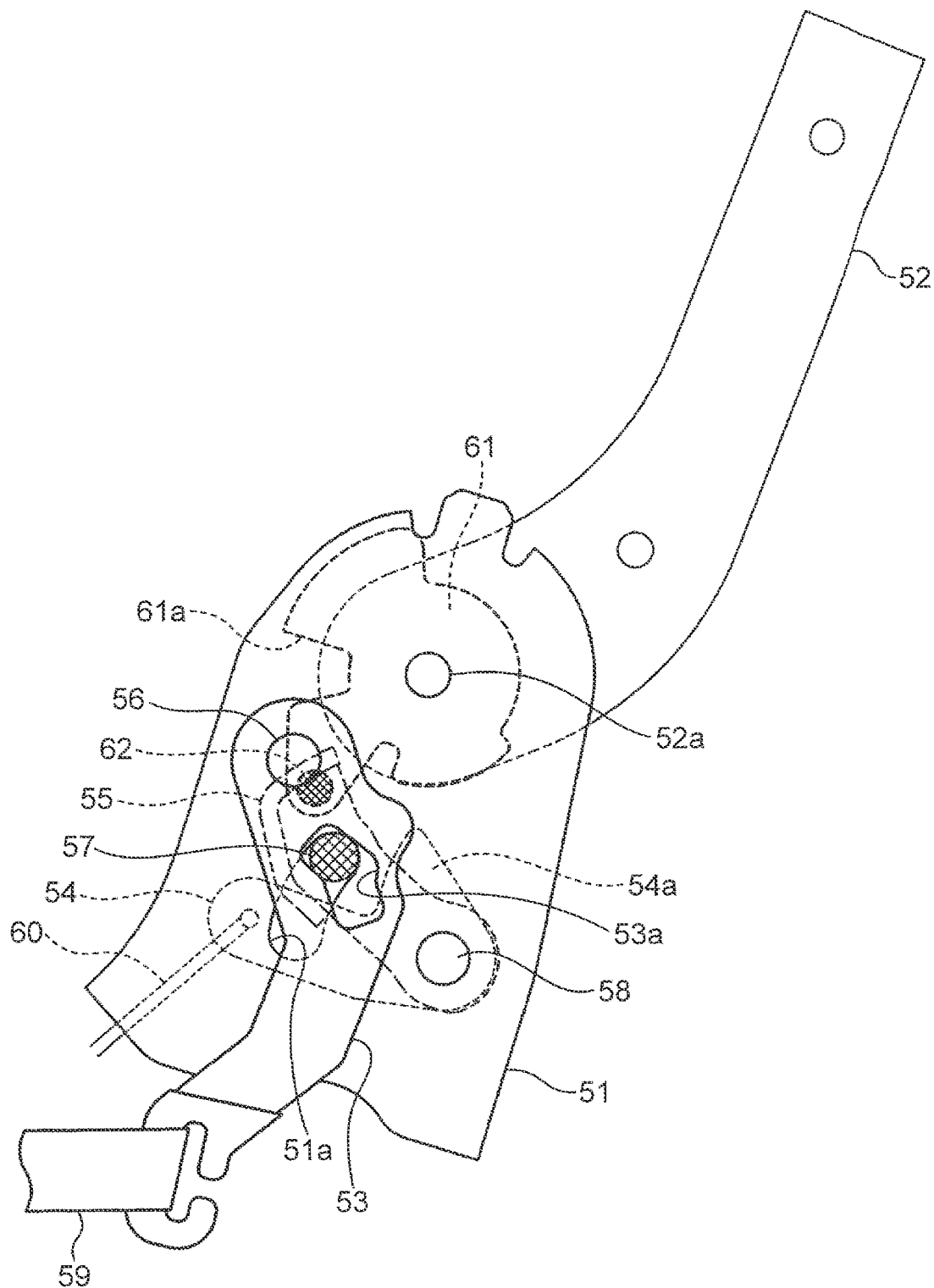
FIG. 14 is a front view showing a main configuration of a conventional seat state switching mechanism.
Figure 15:
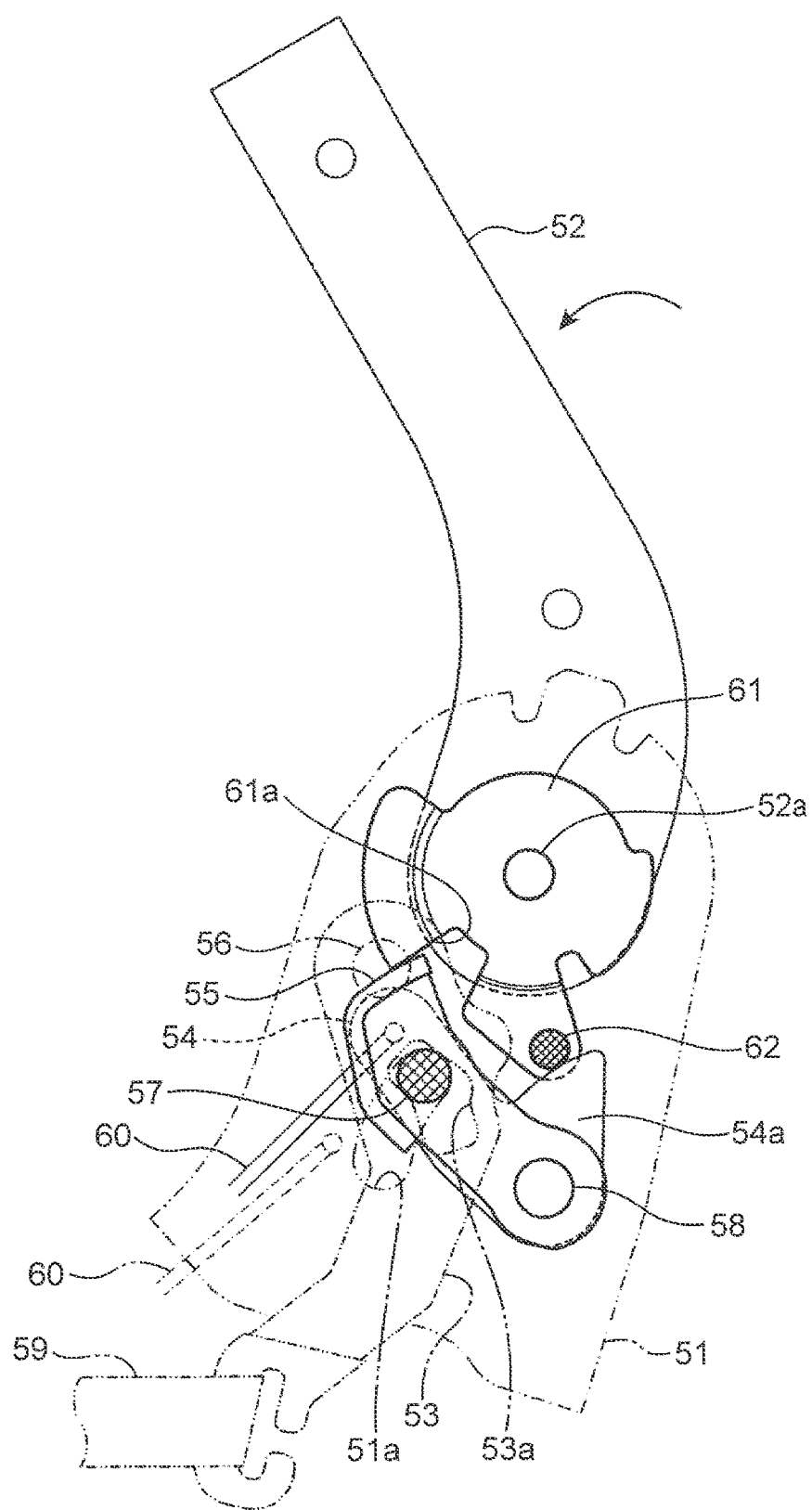
FIG. 15 is a front view showing an operation of the conventional seat state switching mechanism for shifting to a walk-in state.

In the seat state switching mechanism 5, only an operation of tilting the seatback 3 and the movable bracket 14 as shown in FIGS. 11 to 13 is sufficient for shifting the state of the seatback 3 from the initial state where the seat 1 shown in FIG. 1 is sittable to the walk-in state, i.e., to the state where the seatback tilts to the walk-in position at the predetermined angle.

Specifically, in the operation of shifting to the walk-in state in the seat state switching mechanism 5, the tilting of the movable bracket 14 in the counter-clockwise direction in accordance with the tilting of the seatback 3 makes the first pin 20 of the movable bracket 14 rotate in the counter-clockwise direction while pushing the input member 13 downward by abutting the bulging section 13$g$ of the input member 13, as shown in FIGS. 11 to 13. However, the amount of pushing the input member 13 downward only by the first pin 20 is small. Hence, the locking member 12 is kept in the range of the walk-in locking position. This allows the first pin 20 to get under the hook 12$c$ of the locking member 12 and engage with the recess 12$g$. At this time, the locking member 12 is pushed by the first pin 20 and rotates in the clockwise direction. However, the rotation of the locking member 12 is regulated when the second pin 21 attached to the movable bracket 14 abuts a contact surface 12$j$ of the locking member 12. The movable bracket 14 and the seatback 3 can shift to the walk-in state at the predetermined tilt angle owing to the regulation.

Moreover, as shown in FIG. 13, the pin 12$f$ fixedly attached to the locking member 12 rises at a predetermined distance S when the locking member 12 rotates in the clockwise direction. Such rise enables the operation of releasing the slide locking mechanism of the seat 1 via an unillustrated cable connected to the pin 12$f$.

(Characteristics of Embodiment)

(1) The seat state switching mechanism 5 according to the embodiment includes: the movable bracket 14 fixedly attached to the seatback 3 and being tiltable together with the seatback 3; the locking member 12 for locking the movable bracket 14 at the walk-in locking position when the movable bracket 14 tilts; and the releaser (specifically, the releaser composed of the input member 13, the torsion coil spring 18, i.e., the first biasing member, and the tension coil spring 17, i.e., the second biasing member) for releasing the locking of the locking member 12 in receipt of a reclining operation force, and switching the state to the reclining state.

In this configuration, only the operation of tilting the seatback 3 permits the locking member 12 to lock the movable bracket 14 fixedly attached to the seatback 3 at the predetermined walk-in locking position (that is to say, the tilting is restricted) so that the seatback 3 reaches the walk-in position at the predetermined tilt angle. In this manner, the seatback 3 is shiftable to the walk-in state of locking the seatback at the walk-in position. This configuration thus eliminates the necessity of providing a member for operating the locking member 12 by receiving a walk-in operation force in the shifting to the walk-in state. As a result, the number of components of the seat state switching mechanism 5 is reducible. Accordingly, the number of components constituting the structure of the mechanism is reducible.

Incidentally, when the input member 13 composing the releaser receives the reclining operation force, the received force releases the locking of the locking member 12 to thereby enable the switching to the reclining state. In this manner, the seatback 3 is shiftable to the reclining state where the seatback can lean to the frontmost position. Consequently, the seat state switching mechanism 5 having the above-described configuration can achieve the switching between the walk-in state and the reclining state with the smaller number of components.

(2) The movable bracket 14 in the seat state switching mechanism 5 according to the embodiment has the first pin 20 serving as the abutment part which abuts the locking member 12 when the movable bracket 14 tilts. The locking member 12 has the recess 12g serving as the engagement part which engages with the abutment part for locking the movable bracket 14 at the walk-in locking position in no receipt of the reclining operation force by the input member 13 composing the releaser, and the outer peripheral surface 12b which comes into contact with the first pin 20 (abutment part) in receipt of the reclining operation force by the input member 13 (releaser). The outer peripheral surface 12h is configured to, when coming into contact with the first pin 20, be pushed by the first pin 20 in a direction in which the locking member 12 moves to the locking releasing position.

In this configuration, the recess 12g (engagement part) of the locking member 12 engages with the first pin 20 (abutment part) of the movable bracket 14 in no receipt of the reclining operation force by the input member 13, and thus the movable bracket 14 can be reliably locked at the walk-in locking position. In contrast, the outer peripheral surface 12h of the locking member 12 comes into contact with the first pin 20 in receipt of the reclining operation force by the input member 13 (releaser), so that the locking member 12 is pushed by the first pin 20 (abutment part) in a direction in which the locking member moves to the locking releasing position. The pushing can ensure the movement of the locking member 12 to the locking releasing position. As a result, the locking member 12 can reliably perform both the operation of locking the movable bracket 14 at the walk-in locking position and the operation of releasing the locking even with the smaller number of components.

(3) In the seat state switching mechanism 5 according to the embodiment, the releaser includes: the torsion coil spring 18 serving as the first biasing member for biasing the locking member 12 in the direction from the locking position to the lock releasing position; and the input member 13 for receiving the reclining operation force, the input member holding the locking member 12 at the locking position in no receipt of the reclining operation, and releasing the holding of the locking member 12 in receipt of the reclining operation three.

In this configuration, the input member 13 holds the locking member 12 at the locking position in no receipt of the reclining operation force, and releasing the holding of the locking member 12 in receipt of the reclining operation force. The locking member 12 can move from the locking position to the lock releasing position with the biasing three from the torsion coil spring 18 serving as the first biasing member when the holding of the locking member 12 by the input member 13 is released. Accordingly, the locking member 12 is reliably shiftable from the locking position to the lock releasing position.

(4) In the seat state switching mechanism 5 according to the embodiment, the releaser further includes the tension coil spring 17 serving as the second biasing member for biasing the input member 13 from the releasing position for releasing the holding of the locking member 12 to the holding position for holding the locking member 12. The input member 13 is configured to move from the holding position to the releasing position against the biasing force from the tension coil spring 17 in receipt of the reclining operation force.

This configuration allows the input member 13 to reliably hold the locking member 12 at the locking position with the biasing force from the tension coil spring 17 (second biasing member) in no receipt of the reclining operation force. Conversely, the input member 13 moves from the holding position to the releasing position against the biasing force from the tension coil spring 17 in receipt of the reclining operation force. Therefore, the holding of the locking member 12 by the input member 13 is reliably releasable.

(5) In the seat state switching mechanism 5 according to the embodiment, the locking member 12 is at such a position as to lock the movable bracket 14 at the walk-in locking position in no receipt of the reclining operation force by the releaser (specifically, the input member 13).

This configuration including the locking member 12 which can lock the movable bracket 14 at the walk-in locking position in an initial state where the releaser (specifically, the input member 13) does not receive the reclining operation force can avoid a risk that the seatback 3 leans to the frontmost position in the reclining state in no receipt of the reclining operation force.

In other words, in the seat state switching mechanism 5 according to the embodiment, each of the locking member 12 and the input member 13 is always at the walk-in locking position in the initial state without any input of the reclining operation force, as shown in FIG. 2 and FIG. 7. Therefore, as shown in FIGS. 11 to 13, when the seatback 3 leans forward (rotates in the counter-clockwise direction) in no receipt of the reclining operation force, the first pin 20 attached to the movable bracket 14 always engages with the recess (engagement part) 12g of the locking member 12 and allows the locking member 12 to rotate in the clockwise direction. Simultaneously, the first pin 20 can push the input member 13 downward. As a result, the seatback 3 can avoid the risk of leaning to the frontmost position in the reclining state without an input of the reclining operation force.

(6) In the seat state switching mechanism 5 according to the embodiment, the locking member 12 is configured to release the slide locking state of the slide locking mechanism for locking the slide movement of the seat in the front-rear direction thereof when locking the movable bracket 14 at the walk-in locking position (specifically, configured to release the locking of the slide locking device via the cable in accordance with a rise of the pin 12f of the locking member 12).

In this configuration, the locking member 12 can release the slide locking state of the slide locking mechanism when locking the movable bracket 14 at the walk-in locking position, resulting in contribution to a reduction in the number of components for operating the slide locking mechanism.

(7) In the seat state switching mechanism 5 according to the embodiment, when the seatback 3 leans backward, the movable bracket 14 rotates in the clockwise direction. Simultaneously, the first pin 20 can smoothly and reliably move by abutting the straight section 13f of the input member 13.

(8) The seat state switching mechanism 5 according to the embodiment is adoptable as a module to be easily assembled in an existing seat structure.

(9) The seat 1 according to the embodiment includes: the seatback 3; the seat state switching mechanism 5 provided on one side of the seatback 3 in the width direction thereof and serving as the seat state switching mechanism according to claim 1; the existing seat state switching mechanism 6 or the reclining mechanism 6 provided on the other side of the seatback 3 in the width direction thereof, and having the reclining locking operability for locking the seatback 3 at the initial tilt angle and placing the seatback in the reclining locking state, the reclining operability for placing the seatback in the reclining state in receipt of the reclining operation force, and the walk-in operability for placing the seatback 3 in the walk-in state in receipt of the walk-in operation force; the reclining operation force transmission part for transmitting the reclining operation force to the seat state switching mechanism 5 and the existing seat state switching mechanism 6; and the walk-in operation force transmission part for transmitting the walk-in operation force to the existing seat state switching mechanism 6.

In this configuration, the seat state switching mechanism 5 and the existing seat state switching mechanism 6 are provided on the opposite sides of the seatback 3 in the width direction thereof respectively, and therefore the seatback 3 is maintainable in a stably tilted manner in the walk-in state even in the seat 1 having a large width.

(10) In the seat 1 according to the embodiment, the reclining, operation force transmission part includes: the reclining manipulation lever 7 serving as the reclining operation force input section provided on the other side of the seatback 3 in the width direction thereof for receiving an input of the reclining operation force and adapted to transmit the reclining operation force to the existing seat state switching mechanism 6; and the reclining operation force transmission cable 9 serving as the transmission member for transmitting the reclining operation force from the reclining manipulation lever 7 to the seat state switching mechanism 5.

In this configuration provided with the reclining manipulation lever 7 (reclining operation force input section) only on the other side of the seatback 3 in the width direction thereof, the reclining operation force transmission cable 9 (transmission member) can transmit the reclining operation force from the reclining manipulation lever 7 to the seat state switching mechanism 5 located opposite the reclining manipulation lever across the seatback 3. This simplifies the structure by eliminating the necessity of providing the reclining manipulation lever 7 on each of the opposite sides of the seatback 3 in the width direction thereof. Additionally, the seat state switching mechanism 5 and the existing seat state switching mechanism 6 provided on the opposite sides of the seatback 3 in the width direction thereof respectively are simultaneously shiftable to the reclining state, and accordingly the two switching mechanisms can exert high synchronization.

(11) In the seat 1 according to the embodiment, each of the locking member 12 and the input member 13 is always at the initial position in the walk-in in the seat state switching mechanism 5 when no reclining operation is performed. A route for transmitting the operation force from the walk-in manipulation lever 8 to the seat state switching mechanism 5 includes the seatback 3. Therefore, the member for transmitting the operation force to the seat state switching mechanism 5 is only the wire cable (i.e., the reclining operation force transmission cable 9) for transmitting the reclining operation force. In this configuration of the seat 1, only the releasing of the locking of the reclining mechanism is sufficient in the walk-in operation without the necessity of transmitting the operation force to the seat state switching mechanism 5 via the wire cable. This configuration thus can exclude a cable and a link required for the walk-in operation in a structure of a conventional seat state switching mechanism, and considerably reduce the number of components.

(12) A seat, such as a conventional rear seat, having a large width is highly likely to include a reclining mechanism and a switching mechanism collectively arranged on one side of the seat, and have only a hinge structure freely rotatable on the other side thereof. The seat configured in this manner has a possibility that the seatback 3 is twisted and deforms when a load is applied on the other side where no mechanism, such as the reclining mechanism, is provided in a state where the seatback 3 leans forward through the walk-in operation. In contrast, in the seat 1 according to the embodiment, the seat state switching mechanism 5 and the existing seat state switching mechanism 6 are provided on the opposite sides of the seatback 3 in the width direction thereof respectively as shown in FIG. 1, and these switching mechanisms exert the operability of restricting the seatback 3 at the walk-in position at the predetermined tilt angle on the opposite sides of the seatback 3 respectively. Accordingly, the seatback 3 is maintainable in a stably tilted manner in the walk-in operation.

(13) The seat 1 according to the embodiment configured in the above-described manner additionally includes the seat state switching mechanism 5 composed of the smaller number of components while adopting the structure of the existing seat state switching mechanism on a side of the seat where the reclining locking mechanism is absent (i.e., on the side opposite to the side where the existing seat state switching mechanism 6 has the reclining locking operability or the walk-in position switching operability, or both). This configuration is adaptable to the seat 1 having the large width and can maintain the stable tilting in the walk-in operation.

Summary of Embodiment

The embodiment is summarized in the following manner.

A seat state switching mechanism according to the embodiment is a seat state switching mechanism for switching a state of a seat seatback liftable in a front-rear direction of a seat between a walk-in state of locking the seatback at a walk-in position at a predetermined tilt angle and a reclining state of releasing the locking and allowing the seatback to lean to a frontmost position. The seat state switching mechanism includes: a movable bracket fixedly attached to the seatback and being tiltable together with the seatback; a locking member for locking the movable bracket at a predetermined walk-in locking position so that the seatback reaches the walk-in position when the movable bracket tilts through a walk-in operation; and a releaser (specifically, a releaser composed of the input member, the torsion coil spring, i.e., the first biasing member, and the tension coil spring, i.e., the second biasing member) for releasing the locking of the locking member in receipt of the reclining operation force through an reclining operation and switching the state of the seatback, to the reclining state.

In this configuration, for example, only the operation of tilting the seatback after releasing the reclining through the operation of the walk-in lever permits the locking member to lock the movable bracket (specifically, the first pin attached to the movable bracket) of the seatback at the predetermined walk-in locking position (specifically, by the engagement of the locking member with the first pin) so that the seatback reaches the walk-in position at the predetermined tilt angle (that is to say, the tilting is restricted). Accordingly, the seatback is shiftable to the walk-in state of locking the seatback at the walk-in position. This configuration thus eliminates the necessity of providing a member for operating the locking member by receiving a walk-in operation force in the shifting to the walk-in state. As a result, the number of components of the seat state switching mechanism is reducible, and further the structure of the mechanism is simplified.

On the other hand, for instance, when the reclining is released through an operation of the reclining lever, the relevant operation force is transmitted to the releaser. The transmitted operation force releases the locking of the locking member to thereby enable the switching to the reclining state for reaching the frontmost position. In this manner, the seatback is shiftable to the reclining state where the seatback can lean to the frontmost position. Consequently, the seat state switching mechanism having the above-described configuration can achieve the switching between the walk-in state and the reclining state with the smaller number of components.

In the seat state switching mechanism, the movable bracket preferably has an abutment part (specifically, the first pin attached to the movable bracket) which abuts the locking member when the movable bracket tilts. The locking member preferably has an engagement part which engages with the abutment part for locking the movable bracket at the walk-in locking position in no receipt of the reclining operation force by the releaser, and an outer peripheral surface which comes into contact with the abutment part in receipt of the reclining operation force by the releaser. The outer peripheral surface is preferably configured to, when coming into contact with the abutment part, be pushed by the abutment part in a direction in which the locking member moves to a lock releasing position.

In this configuration, the engagement part of the locking member engages with the abutment part of the movable bracket (specifically, the first pin attached to the movable bracket) in no receipt of the reclining operation force by the releaser, and thus the movable bracket can be reliably locked at the walk-in locking position. In contrast, the outer peripheral surface of the locking member comes into contact with the abutment part in receipt of the reclining operation force by the releaser, so that the locking member is pushed by the abutment part in the direction in which the locking member moves to the lock releasing position. The pushing can ensure the movement of the locking member 12 to the locking releasing position. As a result, the locking member can reliably perform both the operation of locking the movable bracket at the walk-in locking position and the operation of releasing the locking even with the smaller number of components.

In the seat state switching mechanism, the releaser preferably includes: a first biasing member for biasing the locking member in a direction from a locking position to the lock releasing position; and an input member for receiving the reclining operation force, the input member holding the locking member at the locking position in no receipt of the reclining operation, and releasing the holding of the locking member in receipt of the reclining operation force.

In this configuration, the input member holds the locking member at the locking position in no receipt of the reclining operation force, and releases the holding of the locking member in receipt of the reclining operation force. The locking member can move from the locking position to the lock releasing position with the biasing force from the first biasing member when the holding of the locking member by the input member is released. Accordingly, the locking member is reliably shiftable from the locking position to the lock releasing position.

In the seat state switching mechanism, the releaser preferably further includes a second biasing member for biasing the input member from a releasing position for releasing the holding of the locking member to a holding position for holding the locking member, and the input member is preferably configured to move from the holding position to the releasing position against a biasing force from the second biasing member in receipt of the reclining operation force.

This configuration allows the input member to reliably hold the locking member at the locking position with the biasing force from the second biasing member in no receipt of the reclining operation three. Conversely, the input member moves from the holding position to the releasing position against the biasing force from the second biasing member in receipt of the reclining operation force. Therefore, the holding of the locking member by the input member is reliably releasable.

In the seat state switching mechanism, the locking member is preferably at such a position as to lock the movable bracket at the walk-in locking position in no receipt of the reclining operation three by the releaser.

This configuration including the locking member which can lock the movable bracket at the walk-in locking position in the initial state where the releaser does not receive the reclining operation three can avoid the risk that the seatback leans to the frontmost position in the reclining state in no receipt of the reclining operation force.

In the seat state switching mechanism, the locking member is preferably configured to release a slide locking state of a slide locking mechanism for locking a slide movement of the seat in the front-rear direction thereof when locking the movable bracket at the walk-in locking position.

In this configuration, the locking member can release the slide locking state of the slide locking mechanism when locking the movable bracket at the walk-in locking position, resulting in contribution to a reduction in the number of components for operating the slide locking mechanism.

The seat according to the embodiment is a seat including the seat state switching mechanism. The seat includes: the seatback; a seat state switching mechanism provided on one side of the seatback in a width direction thereof and serving as the seat state switching mechanism; an existing seat state switching mechanism provided on the other side of the seatback in the width direction thereof, and having a reclining locking operability for locking the seatback at an initial tilt angle and placing the seatback in a reclining locking state, a reclining operability for placing the seatback in the reclining state in receipt of the reclining operation three, and a walk-in operability for placing the seat back in the walk-in state in receipt of a walk-in operation force; a reclining operation three transmission part for transmitting the reclining operation force to the seat state switching mechanism and the existing seat state switching mechanism; and a walk-in operation force transmission part for transmitting the walk-in operation force to the existing seat state switching mechanism.

In this configuration, the seat state switching mechanism and the existing seat state switching mechanism are provided on the opposite sides of the seatback in the width direction thereof respectively, and therefore the seatback is maintainable in a stably tilted manner in the walk-in state even in the seat having a large width.

In the seat, the reclining operation force transmission part preferably includes: a reclining operation force input section provided on the other side of the seatback in the width direction thereof for receiving an input of the reclining operation force and adapted to transmit the reclining operation force to the existing seat state switching mechanism; and a transmission member for transmitting the reclining operation force from the reclining operation force input section to the seat state switching mechanism.

In this configuration provided with the reclining operation force input section only on the other side of the seatback in the width direction thereof, the transmission member can transmit the reclining operation force from the reclining operation force input section to the seat state switching mechanism located opposite the reclining operation force input section across the seatback. This eliminates the necessity of providing the reclining operation force input section on each of the opposite sides of the seatback in the width direction thereof, and thus simplifies the structure. Additionally, the seat state switching mechanisms provided on the opposite sides of the seatback in the width direction thereof respectively are simultaneously shiftable to the reclining state, and accordingly the two switching mechanisms can exert high synchronization.

The seat state switching mechanism and the seat including the seat state switching mechanism according to the embodiment can achieve the switching between the walk-in state and the reclining state with the smaller number of components.

The invention claimed is:

1. A seat state switching mechanism for switching a state of a seatback tiltable in a front-rear direction of a seat between a walk-in state of locking the seatback at a walk-in position at a predetermined tilt angle and a reclining state of releasing the locking and allowing the seatback to lean to a frontmost position, the seat state switching mechanism comprising:
    a movable bracket fixedly attached to the seatback and being tiltable together with the seatback;
    a locking member for locking the movable bracket at a predetermined walk-in locking position so that the seatback reaches the walk-in position when the movable bracket tilts through a walk-in operation; and
    a releaser for releasing the locking of the locking member in receipt of a reclining operation force through a reclining operation and switching the state of the seatback to the reclining state,
    wherein the movable bracket has an abutment part which abuts the locking member when the movable bracket tilts,
    the locking member has an engagement part which engages with the abutment part for locking the movable bracket at the walk-in locking position when the releaser is not in receipt of the reclining operation force, and an outer peripheral surface which comes into contact with the abutment part when the releaser is in receipt of the reclining operation force, and
    the outer peripheral surface is configured to, when coming into contact with the abutment part, be pushed by the abutment part in a direction in which the locking member moves to a lock releasing position.

2. The seat state switching mechanism according to claim 1, wherein the releaser includes:
    a first biasing member for biasing the locking member in a direction from a locking position to the lock releasing position; and
    an input member for receiving the reclining operation force, the input member holding the locking member at the locking position in no receipt of the reclining operation, and releasing the holding of the locking member in receipt of the reclining operation force.

3. The seat state switching mechanism according to claim 2, wherein
    the releaser further includes a second biasing member for biasing the input member from a releasing position for releasing the holding of the locking member to a holding position for holding the locking member, and
    the input member is configured to move from the holding position to the releasing position against a biasing force from the second biasing member in receipt of the reclining operation force.

4. The seat state switching mechanism according to claim 1, wherein
    the locking member is at such a position as to lock the movable bracket at the walk-in locking position when the releaser is not in receipt of the reclining operation force.

5. The seat state switching mechanism according to claim 1, wherein
    the locking member is configured to release a slide locking state of a slide locking mechanism for locking a slide movement of the seat in the front-rear direction thereof when locking the movable bracket at the walk-in locking position.

6. A seat including the seat state switching mechanism according to claim 1, the seat comprising:
    the seatback;
    a seat state switching mechanism provided on one side of the seatback in a width direction thereof and serving as the seat state switching mechanism according to claim 1;
    an existing seat state switching mechanism provided on the other side of the seatback in the width direction thereof, and having a reclining locking operability for locking the seatback at an initial tilt angle and placing the seatback in a reclining locking state, a reclining operability for placing the seatback in the reclining state in receipt of the reclining operation force, and a walk-in operability for placing the seatback in the walk-in state in receipt of a walk-in operation force;
    a reclining operation force transmission part for transmitting the reclining operation force to the seat state switching mechanism and the existing seat state switching mechanism; and
    a walk-in operation force transmission part for transmitting the walk-in operation force to the existing seat state switching mechanism.

7. The seat according to claim 6, wherein
    the reclining operation force transmission part includes:
        a reclining operation force input section provided on the other side of the seatback in the width direction thereof for receiving an input of the reclining operation force and adapted to transmit the reclining operation force to the existing seat state switching mechanism; and
        a transmission member for transmitting the reclining operation force from the reclining operation force input section to the seat state switching mechanism.

8. The seat state switching mechanism according to claim 1, wherein the releaser includes:

a first biasing member for biasing the locking member in a direction from a locking position to the lock releasing position; and an input member for receiving the reclining operation force, the input member holding the locking member at the locking position in no receipt of the reclining operation, and releasing the holding of the locking member in receipt of the reclining operation force.

9. The seat state switching mechanism according to claim 8, wherein the releaser further includes a second biasing member for biasing the input member from a releasing position for releasing the holding of the locking member to a holding position for holding the locking member, and the input member is configured to move from the holding position to the releasing position against a biasing force from the second biasing member in receipt of the reclining operation force.

10. The seat state switching mechanism according to claim 1, wherein the locking member is at such a position as to lock the movable bracket at the walk-in locking position when the releaser is not in receipt of the reclining operation force.

11. The seat state switching mechanism according to claim 2, wherein the locking member is at such a position as to lock the movable bracket at the walk-in locking position when the releaser is not in receipt of the reclining operation force.

12. The seat state switching mechanism according to claim 3, wherein the locking member is at such a position as to lock the movable bracket at the walk-in locking position when the releaser is not in receipt of the reclining operation force.

13. The seat state switching mechanism according to claim 1, wherein the locking member is configured to release a slide locking state of a slide locking mechanism for locking a slide movement of the seat in the front-rear direction thereof when locking the movable bracket at the walk-in locking position.

14. The seat state switching mechanism according to claim 2, wherein the locking member is configured to release a slide locking state of a slide locking mechanism for locking a slide movement of the seat in the front-rear direction thereof when locking the movable bracket at the walk-in locking position.

15. The seat state switching mechanism according to claim 3, wherein the locking member is configured to release a slide locking state of a slide locking mechanism for locking a slide movement of the seat in the front-rear direction thereof when locking the movable bracket at the walk-in locking position.

16. The seat state switching mechanism according to claim 4, wherein the locking member is configured to release a slide locking state of a slide locking mechanism for locking a slide movement of the seat in the front-rear direction thereof when locking the movable bracket at the walk-in locking position.

* * * * *